US011455011B2

(12) United States Patent
Atkinson et al.

(10) Patent No.: US 11,455,011 B2
(45) Date of Patent: Sep. 27, 2022

(54) MODULAR COMPUTING DEVICE WITH COMMON AC POWER

(71) Applicant: Microsoft Technology Licensing, LLC, Redmond, WA (US)

(72) Inventors: Peter A. Atkinson, Redmond, WA (US); James Adam Hunter, Seattle, WA (US); Eric O. Mejdrich, Redmond, WA (US); Russell Hoover, Redmond, WA (US); Jay Tsao, Kirkland, WA (US); Gregory M. Daly, Seattle, WA (US); Michael Grassi, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 154 days.

(21) Appl. No.: 15/443,996

(22) Filed: Feb. 27, 2017

(65) Prior Publication Data

US 2018/0107245 A1  Apr. 19, 2018

Related U.S. Application Data

(60) Provisional application No. 62/444,191, filed on Jan. 9, 2017, provisional application No. 62/407,859, filed on Oct. 13, 2016.

(51) Int. Cl.
*A63F 13/00* (2014.01)
*G06F 1/16* (2006.01)
(Continued)

(52) U.S. Cl.
CPC .......... *G06F 1/1632* (2013.01); *A63F 13/327* (2014.09); *A63F 13/90* (2014.09);
(Continued)

(58) Field of Classification Search
CPC ....... G06F 1/183; G06F 1/4068; G06F 1/0625
See application file for complete search history.

(56) References Cited

U.S. PATENT DOCUMENTS 5,455,466 A     10/1995   Parks et al.
5,673,173 A  *   9/1997   Tsai ...................... G06F 1/1616
                                                        361/679.43
(Continued)

FOREIGN PATENT DOCUMENTS

CN       202817828 U    3/2013
WO       2015075713 A1  5/2015

OTHER PUBLICATIONS

"Non Final Office Action Issued in U.S. Appl. No. 15/443,909", dated May 14, 2018, 17 Pages.
(Continued)

*Primary Examiner* — David L Lewis
*Assistant Examiner* — Eric M Thomas
(74) *Attorney, Agent, or Firm* — Holzer Patel Drennan

(57) ABSTRACT

Disclosed herein is a modular computing device that provides a user options to upgrade an existing computing device as improved expansion units become available without rendering the underlying base unit obsolete. The base unit of the modular computing device receives high-voltage AC power and one or more power supplies within the base unit converts the AC power to low-voltage DC power that is consumed within the base unit. An AC power transfer unit transfers AC power from the base unit to an expansion unit installed within an expansion dock of the base unit. One or more power supplies within the expansion unit convert the received AC power to low-voltage DC power that is consumed within the expansion unit.

19 Claims, 4 Drawing Sheets

(51) Int. Cl.
| | |
|---|---|
| *G06F 1/26* | (2006.01) |
| *H02J 5/00* | (2016.01) |
| *H02J 50/10* | (2016.01) |
| *H04B 5/00* | (2006.01) |
| *A63F 13/327* | (2014.01) |
| *A63F 13/90* | (2014.01) |
| *G06F 1/20* | (2006.01) |
| *H02J 7/00* | (2006.01) |

(52) U.S. Cl.
CPC ............... *G06F 1/20* (2013.01); *G06F 1/26* (2013.01); *H02J 5/005* (2013.01); *H02J 50/10* (2016.02); *H04B 5/0031* (2013.01); *H04B 5/0037* (2013.01); *G06F 2200/1635* (2013.01); *H02J 7/0027* (2013.01); *H02J 7/0032* (2013.01)

(56) References Cited

U.S. PATENT DOCUMENTS

| | | | | |
|---|---|---|---|---|
| 5,768,100 | A * | 6/1998 | Barrus | G06F 1/1616 |
| | | | | 361/679.33 |
| 5,786,984 | A * | 7/1998 | Bonardi | G06F 1/1601 |
| | | | | 361/679.33 |
| 5,880,932 | A | 3/1999 | Jelinger | |
| 6,009,492 | A | 12/1999 | Matsuoka | |
| 6,018,456 | A | 1/2000 | Young et al. | |
| 6,038,126 | A | 3/2000 | Weng | |
| 6,466,433 | B1 | 10/2002 | Diaz et al. | |
| 6,469,742 | B1 | 10/2002 | Trovato et al. | |
| 6,998,821 | B2 | 2/2006 | Sakai et al. | |
| 7,133,293 | B2 | 11/2006 | Fiorentino et al. | |
| 7,239,509 | B1 | 7/2007 | Roeske | |
| 7,280,366 | B1 | 10/2007 | Hendrix et al. | |
| 7,372,465 | B1 | 5/2008 | Tamasi et al. | |
| 7,379,305 | B2 | 5/2008 | Briggs et al. | |
| 7,948,208 | B2 | 5/2011 | Partovi et al. | |
| 7,952,322 | B2 | 5/2011 | Partovi et al. | |
| 8,088,014 | B2 | 1/2012 | Wells | |
| 8,125,487 | B2 | 2/2012 | Bakalash et al. | |
| 8,228,025 | B2 | 7/2012 | Ho et al. | |
| 8,446,417 | B2 | 5/2013 | Diamond | |
| 8,466,583 | B2 | 6/2013 | Karalis et al. | |
| 8,472,436 | B2 * | 6/2013 | Meiri | G06F 1/1632 |
| | | | | 370/386 |
| 8,924,609 | B2 | 12/2014 | Fowler | |
| 8,971,049 | B1 * | 3/2015 | Vier | G06F 1/1632 |
| | | | | 361/752 |
| 9,275,430 | B2 | 3/2016 | Bakalash | |
| 9,415,309 | B2 | 8/2016 | Bentdahl | |
| 9,450,363 | B2 | 9/2016 | Ghosh et al. | |
| 2003/0046452 | A1 | 3/2003 | Andrewartha et al. | |
| 2003/0067744 | A1 | 4/2003 | Pappalardo et al. | |
| 2004/0000815 | A1 | 1/2004 | Pereira | |
| 2004/0032716 | A1 | 2/2004 | Roan | |
| 2004/0184242 | A1 | 9/2004 | Jones et al. | |
| 2005/0190536 | A1 | 9/2005 | Anderson et al. | |
| 2006/0061976 | A1 | 3/2006 | Belson et al. | |
| 2006/0087872 | A1 | 4/2006 | Barsun et al. | |
| 2006/0146492 | A1 | 7/2006 | Reents et al. | |
| 2007/0083298 | A1 | 4/2007 | Pierce et al. | |
| 2007/0087830 | A1 | 4/2007 | Varma et al. | |
| 2008/0116847 | A1 | 5/2008 | Loke et al. | |
| 2008/0182656 | A1 | 7/2008 | Crowder, Jr. | |
| 2010/0130278 | A1 | 5/2010 | Shimabukuro et al. | |
| 2012/0159090 | A1 | 6/2012 | Andrews et al. | |
| 2012/0161696 | A1 * | 6/2012 | Cook | B60L 3/04 |
| | | | | 320/108 |
| 2012/0166014 | A1 | 6/2012 | Garaschenko et al. | |
| 2013/0069431 | A1 * | 3/2013 | Tseng | H02J 7/0044 |
| | | | | 307/43 |
| 2013/0198532 | A1 | 8/2013 | Bailey et al. | |
| 2014/0124468 | A1 | 5/2014 | Lundrigan et al. | |
| 2014/0204525 | A1 | 7/2014 | Pecone et al. | |
| 2015/0026376 | A1 | 1/2015 | Scanlan et al. | |
| 2015/0263537 | A1 | 9/2015 | Azancot et al. | |
| 2015/0343306 | A1 | 12/2015 | Bentdahl | |
| 2016/0149426 | A1 | 5/2016 | Hodges et al. | |
| 2018/0107259 | A1 | 4/2018 | Daly et al. | |

OTHER PUBLICATIONS

Y.N, et al. "Wireless Electricity Transmission Based On Electromagnetic and Resonance Magnetic Coupling", http://www.ijceronline.com/papers/Vol2_issue7/K027048051.pdf, Published Nov. 2012 in International Journal of Computational Engineering Research, vol. 2, Issue 7, 4 pages.

PISTON Console, http://www.xi3.com/piston, Published on: Nov. 8, 2013, 5 pages.

P9X79 _ Motherboards _ ASUS India, https://www.asus.com/in/Motherboards/P9X79/, Published on: Aug. 7, 2013, 5 pages.

Moore Bo, "Give Us a Modular Console We Can Upgrade Like Google's New Phone", https://www.wired.com/2014/04/project-ara-gaming/, Published on: Apr. 21, 2014, 3 pages.

Evangelho, Jason, "Nyko's PS4 Modular Charging Station Looks Like The Cure For Your Ailing DualShock 4 Controllers", http://www.forbes.com/sites/jasonevangelho/2014/10/16/nykos-ps4-modular-charging-station-looks-like-the-cure-for-your-ailing-dualshock-4-controllers/, Published on: Oct. 16, 2014, 4 pages.

How to Add an External Hard Disk to Your Xbox, PS3, or PS4, http://gadgets.ndtv.com/games/features/how-to-add-an-external-hdd-to-your-game-console-646264, Published on: Jan. 9, 2015, 5 pages.

Hill Brandon, "Microsoft Files Patent For Upgradable, Modular Surface All-in-One PC System", http://hothardware.com/news/microsofts-modular-surface-pc-concept-detailed-in-patent, Published on: Feb. 15, 2016, 4 pages.

Steven Bogos, "Microsoft Wants Xbox to be Upgradable Like a PC", http://www.escapistmagazine.com/forums/read/7.935315-Microsoft-Wants-Xbox-to-be-Upgradable-Like-a-PC, Published on Mar. 2, 2016, 2 pages.

James O'Malley, "Played right, Xbox One's upgrade plan could win it the console war", http://www.in.techradar.com/news/gaming/consoles/Played-right-Xbox-Ones-upgrade-plan-could-win-it-the-console-war/articleshow/51247305.cms, Published on: Mar. 3, 2016, 21 pages.

Patterson, Dan, "How to build an external GPU for 4K video editing, VR, and gaming", http://www.techrepublic.com/article/how-to-build-an-external-gpu-for-4k-video-editing-vr-and-gaming/, Published on: Apr. 14, 2016, 8 pages.

Villegas, Tomas, "Apple MacBook Pro with an External Graphics Card!?", https://www.youtube.com/watch?v=62z9Af3HoXg, Published on Jun. 18, 2016, 1 pages.

Gigabyte GP-T3GFx Intel Thunderbolt 3 External Graphics Enclosure (eGPU) with Daisy Chain, https://www.youtube.com/watch?v=IHPiqdcZCec, Published on: Jun. 20, 2016, 1 pages.

Dell E-Port Replicator Docking Station with USB 3.0, https://www.walmart.com/ip/Dell-E-Port-Replicator-Docking-Station-with-USB-3.0/46100637, Retrieved on: Jan. 23, 2017, 7 pages.

32X, https://en.wikipedia.org/wiki/32X, Retrieved on: Feb. 27, 2017, 10 pages.

"Final Office Action Issued in U.S. Appl. No. 15/443,909", dated Nov. 30, 2018, 15 Pages.

\* cited by examiner

MODULAR COMPUTING DEVICE WITH COMMON AC POWER

CROSS-REFERENCE TO RELATED APPLICATIONS

The present application claims benefit of priority to U.S. Provisional Patent Application No. 62/407,859, entitled "Modular Gaming Console" and filed on Oct. 13, 2016, which is specifically incorporated by reference herein for all that it discloses or teaches. The present application further claims benefit of priority to U.S. Provisional Patent Application No. 62/444,191, entitled "Modular Computing Device with Common AC Power" and filed on Jan. 9, 2017, which is also specifically incorporated by reference herein for all that it discloses or teaches.

BACKGROUND

Computing devices encompass a variety of devices that that can be programmed to carry out one or more specific sets of arithmetic and/or logical operations, with or without user input. In the face of advancing technology, a computing device that was state of the art when purchased by a consumer can quickly become obsolete. While some computing devices permit the consumer to selectively upgrade specific components, such upgrades often require specific technical knowledge to be performed safely and successfully. Thus, most computing devices are discarded rather than upgraded when they become obsolete.

SUMMARY

Implementations described and claimed herein address the foregoing and following problems by providing a modular computing device including a base unit, an expansion unit, and a AC power transfer unit between the base unit and the expansion unit. The base unit includes a base system board providing computing functionality to the base unit, an external power connector that receives AC power into the base unit, a base power supply that rectifies the received AC power to DC power to power the base unit; and an expansion dock that removably receives the expansion unit.

Implementations described and claimed herein address the foregoing and following problems by further providing a method of powering a modular computing device. The method includes receiving AC power from an external power connector to a base unit of the modular computing device, rectifying the AC power to DC power to power the base unit, docking a removable expansion unit within an expansion dock of the base unit, transferring AC power from the base unit to the expansion unit via an AC power transfer unit at the expansion dock, rectifying the transferred AC power to DC power to power the expansion unit, and establishing a data connection between the base unit and the expansion unit.

Implementations described and claimed herein address the foregoing and following problems by still further providing a gaming console including a base unit, a removable expansion unit, and a AC power transfer unit between the base unit and the expansion unit. The base unit includes a system board, a data connector to the system board at an expansion dock, an external power connector that receives AC power into the base unit, and a base power supply that rectifies the received AC power to DC power to power the base unit. The AC power transfer unit is located at the expansion dock and is coupled to the external power connector. The removable expansion unit includes a performance enhancing component and an expansion power supply that receives AC power from the AC power transfer unit and rectifies the received AC power to DC power to power the removable expansion unit.

Other implementations are also described and recited herein. This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTIONS

A video game console is a specific type of computing device that accepts user inputs and outputs an audio/video signal so that one or more users may play a video game. Consumers are often faced with many console offerings, including multiple offerings from a single manufacturer. Thus, a consumer may have a great deal of confusion and uncertainty with making a console purchase decision. The consumer may end up waiting for the next console release rather than purchasing a new console. Further, consumers are often frustrated and apprehensive regarding rapid console releases. For example, consumers may question whether a new release will be backward compatible with previously purchased games.

Video game consoles traditionally do not offer the consumer an opportunity to upgrade specific components of the console. Further, in minimizing cost, console manufacturers are driven to minimize power supply capabilities supplied with a console to that required to operate the console. Thus, a power supply provided as an integral part of the console may be insufficient to power an intended upgrade to the console. As a result, like other computing devices, most consoles are discarded rather than upgraded when they become obsolete. However, consumers may balk at spending several hundred dollars to replace obsolete consoles on a regular basis. The modular computing devices described in detail herein are intended to address some or all of the foregoing problems, as well as other problems not specifically identified herein.

Figure 1:
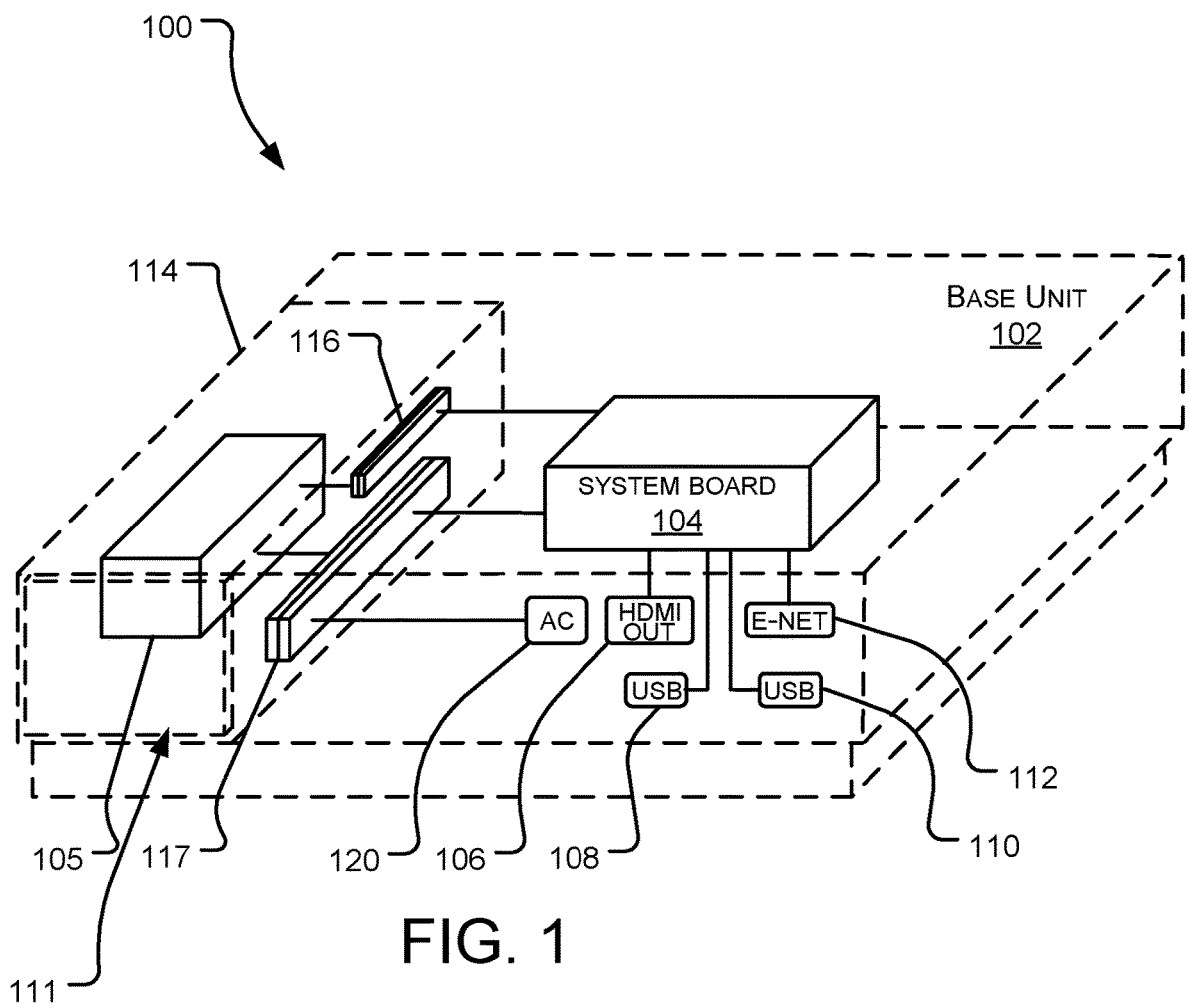
FIG. 1 illustrates an example modular computing device with common AC power.

FIG. 1 illustrates an example modular computing device 100 with common AC power. The computing device 100 includes a base unit 102 that provides a physical platform for mounting and encompassing various components of the computing device 100. The computing device 100 further includes an expansion unit 114 that selectively physically interfaces with and attaches to the base unit 102 of the computing device 100 by inserting or sliding into an expansion dock 111 (e.g., an aperture or slot) in the base unit 102, and snapping or rotating in place to physically secure the expansion unit 114 to the base unit 102. Further, power and I/O (or data) connections between an expansion board 105 and a system board 104 within the computing device 100 are automatically made when the user physically interfaces the expansion unit 114 to the base unit 102.

The system board 104 may include a central processing unit (CPU), memory, a power connector, and various input/output connectors to additional components of the computing device 100. An operating system, such as one of the varieties of the Microsoft Windows® operating system, may reside in the memory and is executed by the central processing unit, although other operating systems may be employed by the computing device 100. In various implementations, the system board 104 may also include a graphics processing unit (GPU), secondary memory (e.g., flash or optical storage), heat dissipation fans and/or sinks, a backup battery, etc.

The various input/output connectors of the system board 104 may include the depicted HDMI 106, USB 108, USB 110, and Ethernet 112, as well as a subset of the depicted connectors and/or additional connectors with preselected physical forms and operating over preselected communication standards (e.g., component A/V, optical audio, infrared (IR) receiver, transmitter, or transceiver, etc.). The various input/output connectors of the system board 104 may permit the computing device 100 to be connected to a variety of peripheral devices (e.g., a television, a computer display, a game controller, a keyboard, a mouse, etc.) and/or provide network connectivity. The base unit 102 may also include one or more communication transceivers to provide wireless network connectivity (e.g., a mobile phone network, Wi-Fi®, BlueTooth®, etc.) or a positioning system (e.g., a global positioning satellite transceiver). Still further, the base unit 102 may also include one or more cameras or motion sensors, one or more audio interfaces (e.g., a microphone, an audio amplifier, a speaker, and an audio jack), one or more antennas, and additional storage. Other configurations may also be employed.

The system board 104 is connected to the expansion board 105 within the expansion unit 114 via data connector 116 (e.g., a peripheral component interconnect express (PCIe or PCI-E) connector). The data connector 116 provides input/output connectivity between the system board 104 and the expansion board 105.

AC transfer unit 117 is a mechanism for safely transferring high-voltage AC power (e.g., 110/120V AC or greater) from the base unit 102 to the expansion unit 114. In some implementations, the AC transfer unit 117 is an AC backbone that conducts the AC power incoming to the computing device 100 via external power connector 120 to both the base unit 102 and the expansion unit 114 (see e.g., FIG. 2 and detailed description thereof). In other implementations, the AC transfer unit 117 is a first half of an inductive coupling, which inductively transfers power to a second half of the inductive coupling when placed in close physical proximity with the second half of the inductive coupling (see e.g., FIG. 3 and detailed description thereof).

Both the base unit 102 and the expansion unit 114 include separate power supplies (not shown, see e.g., power supplies 256, 258 of FIG. 2 and power supplies 356, 358 of FIG. 3) that convert (or rectify) the high-voltage AC power supplied via the AC transfer unit 117 to low voltage DC power (e.g., 12V DC, or less) that is consumed by the computing device 100. More specifically, the power supply for the base unit 102 is sized to provide sufficient power to operate the system board 104 and all other power-consuming components of the base unit 102 with little to no excess power capacity (e.g., less than 5% greater than a peak expected power demand). Similarly, the power supply for the expansion unit 114 is sized to provide sufficient power to operate the expansion board 105 and all other power-consuming components of the expansion unit 114 with little to no excess power capacity (e.g., less than 5% greater than a peak expected power demand). Further, the AC power is provided to the AC transfer unit 117 via external power connector 120 on the base unit 102. Thus, the expansion unit 114 does not incorporate a separate external power connector.

In various implementations, the base unit 102 functions without the expansion unit 114 at a base level of performance. Adding the expansion unit 114 to the base unit 102 adds one or more performance enhancing features or components to the base unit 102 (CPU, GPU, memory, data storage, audio and/or video upgrades, and additional physical connectors). In various implementations, the computing device 100 is a gaming device, smart phone, tablet computer, laptop computer, personal computer, or any other discrete device that carries out one or more specific sets of arithmetic and/or logical operations.

Figure 2:
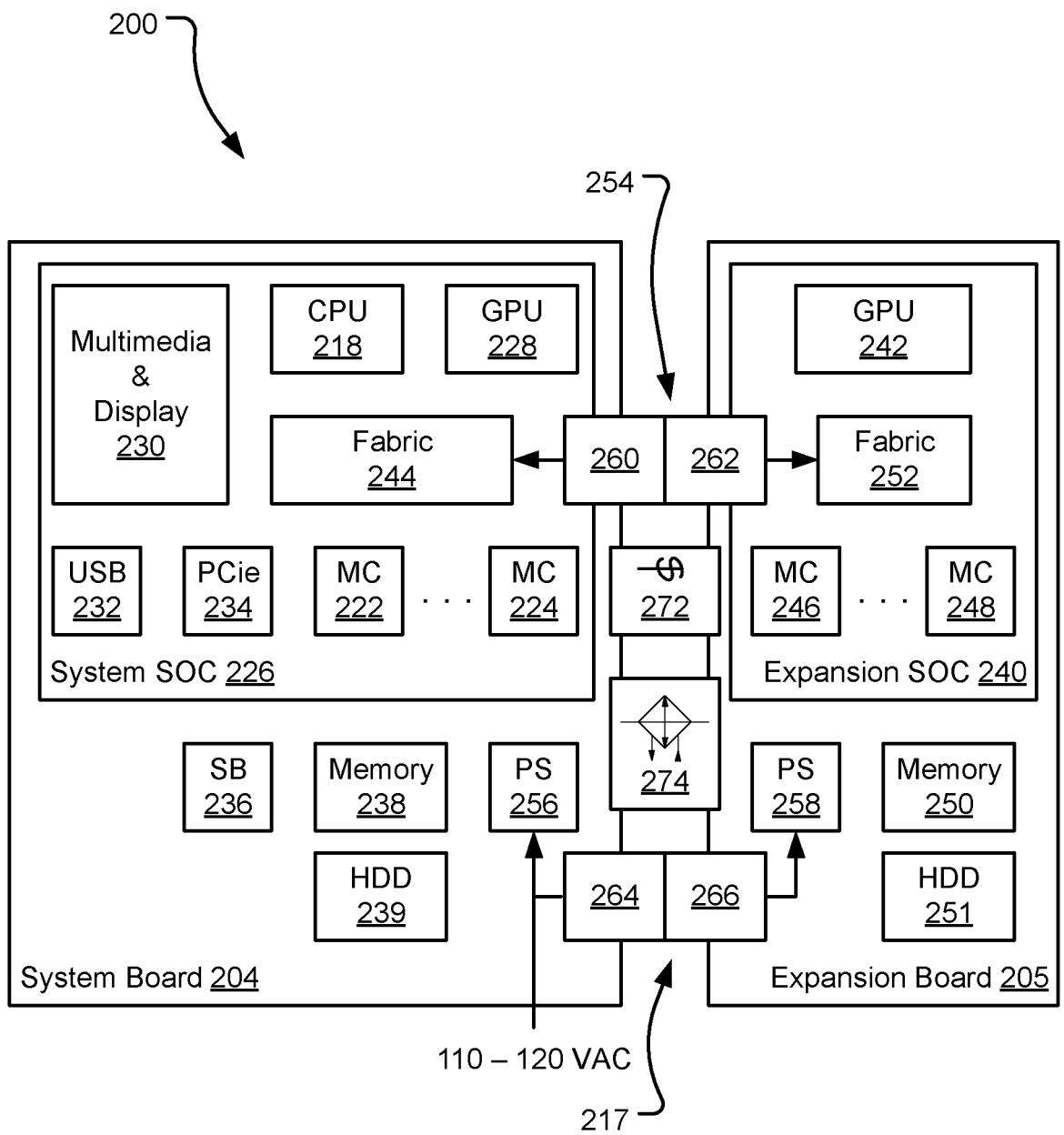
FIG. 2 illustrates a first example system diagram for a modular computing device with common AC power.

FIG. 2 illustrates a first example system diagram for a modular computing device 200 with common AC power. System board 204 is contained within a base unit (not shown, see e.g., base unit 102 of FIG. 1) and includes a system on chip (SOC) 226, which includes a central processing unit (CPU) 218 (e.g., discrete or integrated microelectronic chips and/or separate but integrated processor cores), a graphics processing unit (GPU) 228, a series of memory controllers (e.g., memory controllers 222, 224), and various external interfaces to additional components of the computing device 200 (e.g., multimedia and display interface 230, USB interface 232, and PCIe interface 234). In various other implementations, the aforementioned components are distributed across the system board 204 rather than being concentrated within the SOC 226.

The system board 204 also includes a southbridge 236, which provides connectivity to a variety of external ports (not shown, see e.g., ports 106, 108, 110, 112 of FIG. 1) and/or additional connectors with preselected physical forms and operating over preselected communication standards (e.g., component A/V, optical audio, IR receiver, transmitter, or transceiver, etc.). The various input/output connectors of the system board 204 may permit the computing device 200 to be connected to a variety of peripheral devices (e.g., a television, a computer display, a game controller, a keyboard, a mouse, etc.). The system board 204 further includes memory 238 that may include one or both of volatile memory (e.g., RAM, DDR, etc.) and non-volatile memory (e.g., eMMC, flash memory, etc.). An operating system, such as one of the varieties of the Microsoft Windows® operating system, may reside in the memory 238 and is executed by the central processing unit 218, although other operating systems may be employed by the computing device 200. Still further, the system board 204 includes a hard disk drive 239 (or other non-volatile storage media) that provides data storage to the system board 204. Additional or fewer features may be incorporated within the system board 204. Finally, the various components of the system board 204 are interconnected via fabric 244.

Expansion board 205 is contained within an expansion unit (not shown, see e.g., expansion unit 114 of FIG. 1) and includes performance enhancing components. For example, an expansion system on chip (SOC) 240 includes an additional graphics processing unit 242 and an additional series of memory controllers (e.g., memory controllers 246, 248). The expansion board 205 further includes additional graphics memory 250 (e.g., high-bandwidth memory). Finally, the various components of the expansion board 205 are interconnected via fabric 252. When the expansion board 205 is used in conjunction with the system board 204, the additional graphics processing unit 242 may be operated in addition to or in lieu of the graphics processing unit 228 of the system board 204. The expansion board 205 also includes a hard disk drive 251 (or other non-volatile storage media) that provides additional data storage. In some implementations, a controller for the hard disk drive 251 is located on the SOC 226, which is only utilized when an expansion board incorporating a hard disk drive is used in conjunction with the system board 204. In various other implementations, the aforementioned components are distributed across the expansion board 205 rather than being concentrated within the SOC 240. Additional or fewer features than those described above may be incorporated within the expansion board 205.

A variety of expansion boards with different capabilities may be available for a user to select from based on the user's needs. For example, other expansion boards may incorporate an additional CPU, or omit the GPU 242, memory 250, or HDD 251 from the expansion board 205. Still further, while other expansion boards may have similar components as the expansion board 205, the individual components within the other expansion boards may have differing performance features (e.g., a higher or lower speed CPU or GPU, more or less total memory, or more or less storage capacity).

The system board 204 fabric 244 is connected to the expansion board 205 fabric 252 via a high-speed communication and data connection 254 (e.g., a PCIe connection). The high-speed data connection provides input/output connectivity between the system board 204 and the expansion board 205. FIG. 2 illustrates the high-speed data connection 254 as a two-part physical connector with a first part 260 residing on the base unit and connected to the system board 204 and a second part 262 residing on the expansion unit and connected to the expansion board 205. The high-speed data connection 254 is created when the first and second parts 260, 262 are physically connected. In other implementations, the high-speed data connection 254 may exist in whole or in part wirelessly (see e.g., high-speed data connection 354 of FIG. 3).

The programming model and basic architecture may be shared between the CPU 218, GPU 228, and GPU 242 so that the expansion board 205 performance adds to rather than replaces the system board 204 performance. In addition, the memory 238 and memory 250 may share virtual address space so that the CPU 218, GPU 228, and GPU 242 can view the memory 238 and the memory 250 as a single memory store. The HDD 239 and the HDD 251 may also be similarly addressed so that the CPU 218, GPU 228, and GPU 242 can view the HDD 239 and the HDD 251 as a single combined data storage.

In some implementations, the high-speed data connection operates in a cache coherent manner. More specifically, each of the CPU 218, GPU 228, and GPU 242 has access to one or more caches associated with the memory 238 and the memory 250. As a result, a cache coherence protocol is enforced which ensures that changes in the values of shared operands within the cache(s) are propagated throughout the fabric 244 and fabric 252 in a timely fashion. Further, the high-speed data connection may incorporate a data security protocol (e.g., data encryption) in order to prevent unauthorized monitoring or tampering with data passing between the system board 204 and the expansion board 205.

The power supply 256 receives externally supplied high-voltage AC power and converts the AC power to low-voltage DC power that is consumed by the system board 204 and other components of the base unit. The power supply 256 is sized to provide sufficient power to operate the system board 204 and all other power-consuming components of the base unit with little to no excess power capacity. The power supply 258 receives high-voltage AC power from the base unit via AC transfer unit 217 and converts the AC power to low-voltage DC power that is consumed by the expansion board 205 and other components of the expansion unit. The power supply 258 is sized to provide sufficient power to operate the expansion board 205 and all other power-consuming components of the expansion unit with little to no excess power capacity.

The AC transfer unit 217 is a mechanism for safely transferring high-voltage AC power from the base unit to the expansion unit. In some implementations, the AC transfer unit 217 is a two-part physical connector with an AC backbone 264 and an AC receiver 266 that conducts the AC power incoming to the base unit to both the base power supply 256 and the expansion power supply 258.

Connection of the high-speed communication and data connection 254 and the AC transfer unit 217 between the base unit and the expansion unit may be preconditioned on closing switch 272 or performing a security authentication between the base unit and the expansion unit. The switch 272 ensures that the expansion unit is properly mounted to or within the expansion dock (not shown, see e.g., expansion dock 111 of FIG. 1) of the base unit prior to making the communication, data, and/or power connections. This preconditioning may be for safety reasons (e.g., by not permitting a user to access the high-voltage AC power at the AC backbone 264). For example, the AC backbone 264 may have a physical shield that is automatically retracted with the switch 272 is closed. For further example, the AC backbone 264 may only be supplied AC power when the switch 272 is closed. This preconditioning may also be for functionality reasons. For example, closing the switch signals to the base unit to attempt communication, data, and/or power connections with the expansion unit. Similarly, opening the switch signals to the base unit to cease communication, data, and/or power connections with the expansion unit.

The switch 272 may take a variety of physical forms and incorporate a variety of technologies adapted to detect the presence of the expansion unit within the expansion dock (e.g., mechanical, capacitive, Doppler sensor, eddy-current, inductive, laser sensor, magnetic sensor, optical sensor, infrared sensor, photocell, radar, sonar, and hall effect). The switch may also include a physical or magnetic seat that ensures that the expansion unit is properly aligned and installed within the expansion dock in the base unit. In other implementations, the switch 272 and/or the seat is omitted.

The modular computing device 200 also incorporates a shared heat exchanger 274, which conducts thermal energy away from both the system board 204 and associated base unit and the expansion board 205 and associated expansion unit. The heat exchanger 274 may incorporate a variety of thermal solutions (e.g., convective fans, conductive plates, liquid-cooled heat exchangers, etc.). In other implementations, the base unit and the expansion unit each have their own thermal solutions in addition to or in lieu of the shared heat exchanger 274.

In various implementations, the performance enhancing components of the expansion unit (e.g., connectors or ports, graphics processing, computing power, and data storage) may be combined into a single expansion unit or different combinations of features may be combined in different expansion units. Further, the computing device 200 may physically accommodate more than the depicted one expansion unit. That way, a user may select several expansion units possessing features best suited to the user's needs. In various implementations, the computing device 200 is a gaming device, smart phone, tablet computer, laptop computer, personal computer, or any other discrete device that carries out one or more specific sets of arithmetic and/or logical operations.

Figure 3:
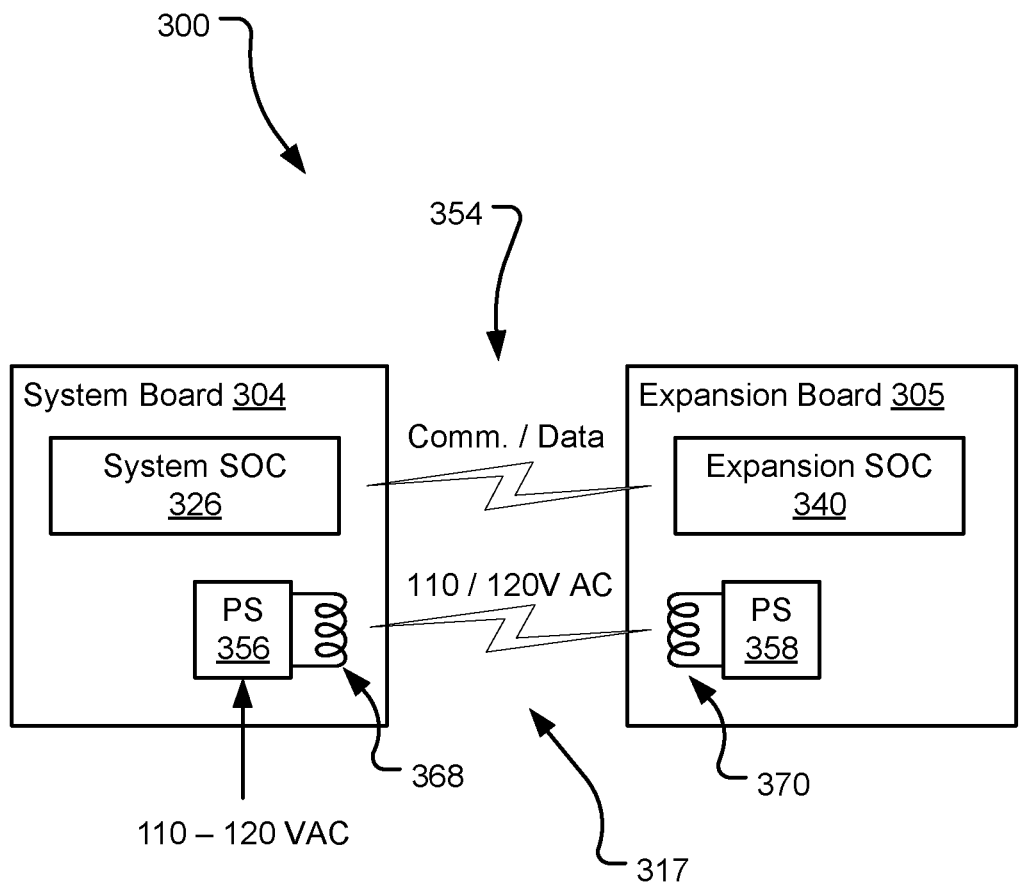
FIG. 3 illustrates a second example system diagram for a modular computing device with common AC power.

FIG. 3 illustrates a second example system diagram for a modular computing device 300 with common AC power. System board 304 is contained within a base unit (not shown, see e.g., base unit 102 of FIG. 1) and includes a system on chip (SOC) 326 and a base power supply 356. Individual components of the SOC 326 and additional components of the system board 304 are as described above with regard to SOC 226 and system board 204 of FIG. 2. Expansion board 305 is contained within an expansion unit (not shown, see e.g., expansion unit 114 of FIG. 1) and includes an expansion system on chip (SOC) 340 and an expansion power supply 358. Individual components of the SOC 340 and additional components of the expansion board 305 are as described above with regard to SOC 240 and expansion board 205 of FIG. 2.

A variety of expansion boards with different capabilities may be available for a user to select from based on the user's needs. For example, the expansion board 305 may incorporate one or more performance enhancing components (e.g., an additional CPU, GPU, memory, and HDD). Still further, while other expansion boards may have similar components as the expansion board 305, the individual components within the other expansion boards may have differing performance levels (e.g., a higher or lower speed CPU or GPU, more or less memory, or more or less storage capacity).

The system board 304 is connected to the expansion board 305 via a high-speed communication and data connection 354. The high-speed data connection provides input/output connectivity between the system board 304 and the expansion board 305. In various implementations, the high-speed data connection 354 operates according to a short-range wireless communication standard such as Bluetooth, infrared, near field communication, ultraband, and ZigBee. Other short-range wireless communication standards are contemplated herein. As shown, the communication and data connection 354 is established via a wireless data connector. In other implementations, the high-speed data connection 354 is established via a two-part physical connector, as described in detail above with regard to high-speed data connection 254 of FIG. 2.

The programming model, basic architecture, and memory addressing may be shared between the system SOC 326 and the expansion SOC 340 so that the expansion board 305 performance adds to rather than replaces the system board 304 performance. Further, the high-speed data connection may operate in a cache coherent manner. Still further, the high-speed data connection may incorporate a data security protocol to prevent unauthorized monitoring or tampering with data passing between the system board 304 and the expansion board 305.

The power supply 356 receives externally supplied high-voltage AC power and converts the AC power to low-voltage DC power that is consumed by the system board 304 and other components of the base unit. The power supply 356 is sized to provide sufficient power to operate the system board 304 and all other power-consuming components of the base unit with little to no excess power capacity. The power supply 358 receives high-voltage AC power from the base unit via AC transfer unit 317 and converts the AC power to low-voltage DC power that is consumed by the expansion board 305 and other components of the expansion unit. The power supply 358 is sized to provide sufficient power to operate the expansion board 305 and all other power-consuming components of the expansion unit with little to no excess power capacity.

The AC transfer unit 317 is a mechanism for safely transferring high-voltage AC power from the base unit to the expansion unit. Here, the AC transfer unit 317 is a wireless power coupling between the system board 304 and the expansion board 305. The AC transfer unit 317 may utilize time-varying electric, magnetic, or electromagnetic fields as a mechanism for wirelessly transferring AC power from the base unit to the expansion unit. Specific wireless power transfer technologies that could be used include inductive coupling, resonant inductive coupling, capacitive coupling, and magneto-dynamic coupling.

By way of example, the AC transfer unit 317 is depicted in FIG. 2 as a pair of inductive coils 368, 370 that together form a transformer. The incoming 110-120 VAC power is transmitted through the inductive coil 368, which creates an oscillating magnetic field. The magnetic field induces an alternating electromotive force in the inductive coil 370, which creates an AC current at the power supply 358. The AC current at the power supply 358 is then rectified to low-voltage DC power that is consumed by the expansion board 305 and other components of the expansion unit.

In implementations where the base unit can physically accommodate multiple expansion units simultaneously, the AC transfer unit 317 includes multiple inductive coils or a particularly large single inductive coil within the base unit and an individual inductive coil within each expansion unit coupled to the multiple inductive coils or the large single inductive coil within the base unit. In other implementations, the AC transfer unit 317 is a two-part physical connector, as described in detail above with regard to AC transfer unit 217 of FIG. 2.

In various implementations, connection of the high-speed communication and data connection 354 and the AC transfer unit 317 between the base unit and the expansion unit is preconditioned on closing a switch (not shown, see e.g., switch 272 of FIG. 2). The switch ensures that the expansion unit is properly mounted to or within an expansion dock (not shown, see e.g., expansion dock 111 of FIG. 1) of the base unit prior to making the communication, data, and/or power connections. The modular computing device 300 may also incorporate a shared heat exchanger (not shown, see e.g., heat exchanger 274 of FIG. 2). In other implementations, the base unit and the expansion unit each have their own thermal solutions in addition to or in lieu of the shared heat exchanger.

In various implementations, the performance enhancing features or components of the expansion unit (e.g., connectors or ports, graphics processing, computing power, and data storage) may be combined into a single expansion unit or different combinations of features may be combined in different expansion units. Further, the computing device 300 may physically accommodate more than the depicted one expansion unit. That way, a user may select several expansion units possessing features best suited to the user's needs. In various implementations, the computing device 300 is a gaming device, smart phone, tablet computer, laptop computer, personal computer, or any other discrete device that carries out one or more specific sets of arithmetic and/or logical operations.

Figure 4:
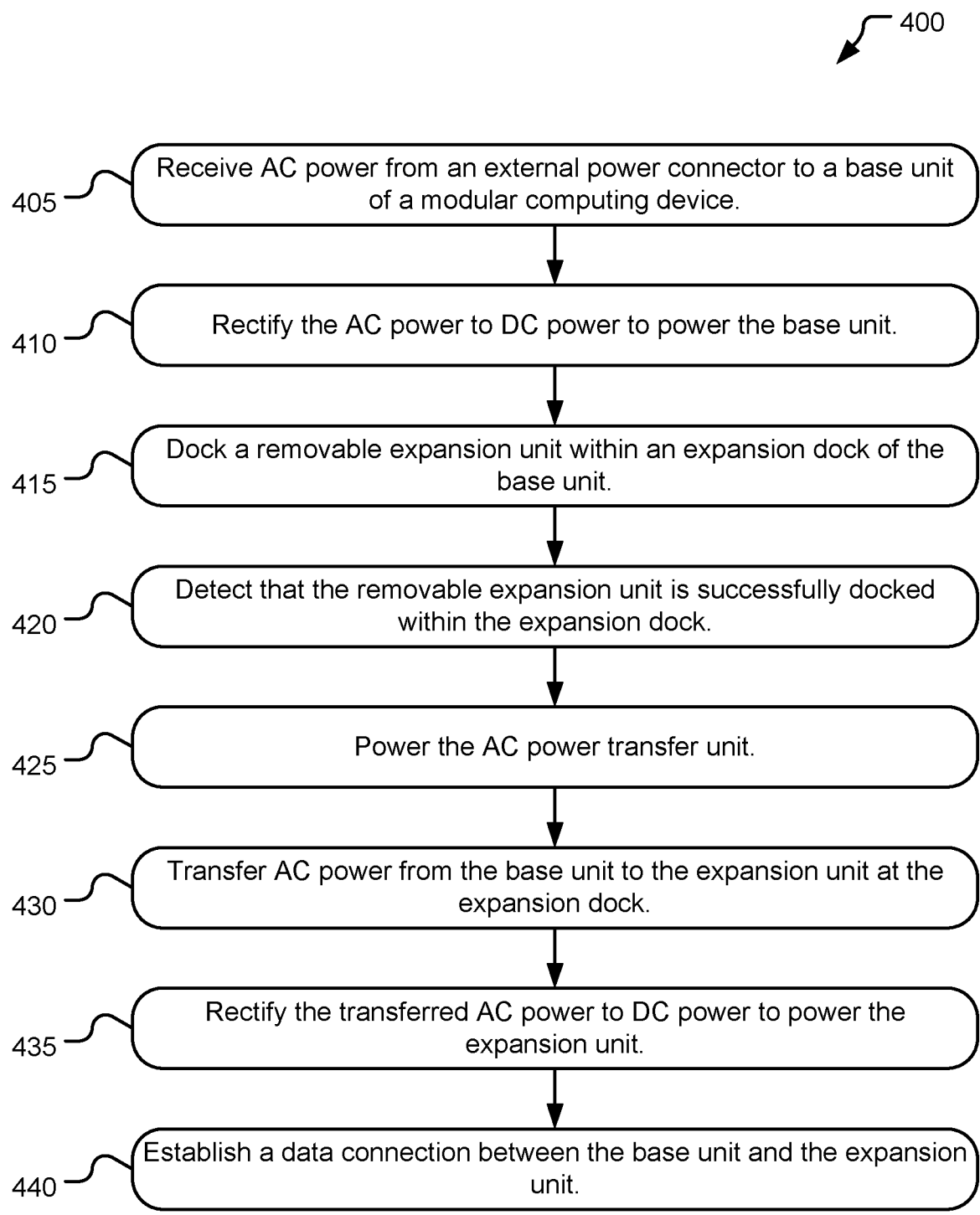
FIG. 4 illustrates example operations for powering a modular computing device with common AC power.

FIG. 4 illustrates example operations 400 for powering a modular computing device with common AC power. A receiving operation 405 receives AC power from an external power connector to a base unit of the modular computing device. In various implementations, the AC power is provided from a common 110/120 VAC source. A first rectifying operation 410 rectifies the AC power to DC power to power the base unit. In various implementations, the first rectifying operation 410 is performed by one or more power supplies contained within the base unit.

A docking operation 415 docks a removable expansion unit within an expansion dock of the base unit. The removable expansion unit includes one or more performance enhancing features or components that supplement the performance of the base unit alone. A user may physically slide, insert, or otherwise mechanically interface the expansion unit with the expansion dock on the base unit to accomplish the docking operation 415.

In some implementations, the docking operation 415 includes a user removing a first expansion unit from the modular computing device, selecting a second expansion unit from a selection of one or more expansion units available to the user, and installing the selected second expansion unit into the modular computing device. In various implementations, the docking operation 415 also requires no specialized tools or knowledge on behalf of the user.

A detecting operation 420 detects that the removable expansion unit is successfully docked within the expansion dock. The detecting operation 420 may be performed by a mechanical switch or sensor that indicates a successful docking of the expansion unit in the expansion dock. A powering operation 425 powers a AC power transfer unit responsive to detection of a successful docking of the expansion unit within the expansion dock. In various implementations, the AC power transfer unit may be a AC power backbone or a first half of an AC wireless power coupling.

A transferring operation 430 transfers AC power from the base unit to the expansion unit at the expansion dock. The transferring operation 430 may conduct AC power via the AC power backbone or induct AC power between the first half of the AC wireless power coupling within the base unit and a second half of the AC wireless power coupling within the expansion unit. A second rectifying operation 435 rectifies the transferred AC power to DC power to power the expansion unit. In various implementations, the second rectifying operation 435 is performed by one or more power supplies contained within the expansion unit.

An establishing operation 440 establishes a data connection between the base unit and the expansion unit. The data connection may be established via a physical data connector or a near-field, high-speed wireless connection, for example. In various implementations, the computing device is a gaming device, smart phone, tablet computer, laptop computer, personal computer, or any other discrete device that carries out one or more of the aforementioned operations or other specific sets of arithmetic and/or logical operations.

The logical operations making up the implementations described herein are referred to variously as operations, steps, objects, or modules. Furthermore, the logical operations may be performed in any order, adding or omitting operations as desired, unless explicitly claimed otherwise or a specific order is inherently necessitated by the claim language.

An example modular computing device according to the presently disclosed technology includes a base unit and an AC power transfer unit. The base unit includes a base system board to provide computing functionality to the base unit, an external power connector to receive AC power into the base unit, a base power supply to rectify the received AC power to DC power to power the base unit, and an expansion dock to removably receive an expansion unit. The AC power transfer unit is at the expansion dock and coupled to the external power connector.

In another example modular computing device, the AC transfer unit includes a AC power backbone at the base unit.

In another example modular computing device, the AC transfer unit includes a first half of an AC wireless power coupling at the base unit.

Another example modular computing device further includes a removable expansion unit including a second half of the AC wireless power coupling. The second half forms a wireless power transfer device in combination with the first half of the AC wireless power coupling at the base unit.

Another example modular computing device further includes a removable expansion unit. The removable expansion unit includes an expansion system board incorporating a performance enhancing component, and an expansion power supply to receive AC power from the AC power transfer unit and to rectify the received AC power to DC power to power the expansion unit.

Another example modular computing device further includes a data connector between the base system board and the expansion system board.

In another example modular computing device, the performance enhancing component includes one or more of a CPU, GPU, memory, data storage, and additional physical connectors.

In another example modular computing device, the base power supply is sized to power solely the base unit. The expansion power supply is sized to power solely the removable expansion unit.

In another example modular computing device, the base unit and the removable expansion unit share a common heat exchanger.

In another example modular computing device, the base unit and the removable expansion unit share one or both of a common virtual addressing space and a programming model.

In another example modular computing device, the expansion dock includes a switch to trigger connection of the AC power transfer unit between the base system board and the expansion system board responsive to proximity of the removable expansion unit to the expansion dock.

In another example modular computing device, the expansion dock includes a switch to trigger connection of the data connector between the base system board and the expansion system board responsive to proximity of the removable expansion unit to the expansion dock.

In another example modular computing device, the data connector utilizes a near-field, high-speed wireless connection.

In another example modular computing device, the modular computing device is a gaming console.

An example method of powering a modular computing device according to the presently disclosed technology includes receiving AC power from an external power connector to a base unit of the modular computing device, rectifying the AC power to DC power to power the base unit, docking a removable expansion unit within an expansion dock of the base unit, transferring AC power from the base unit to the expansion unit via an AC power transfer unit at the expansion dock, rectifying the transferred AC power to DC power to power the expansion unit, and establishing a data connection between the base unit and the expansion unit.

In another example method, the docking operation includes removing an initial expansion unit from the expansion dock, selecting the removable expansion unit from a selection of available expansion units, and installing the selected removable expansion unit within the expansion dock.

In another example method, prior to the transferring operation, the method further includes detecting that the removable expansion unit is successfully docked within the expansion dock, and powering the AC power transfer unit responsive to the detecting operation.

An example gaming console according to the presently disclosed technology includes a base unit, a AC power transfer unit, and a removable expansion unit. The base unit includes a system board, a data connector to the system board at an expansion dock, an external power connector to receive AC power into the base unit, and a base power supply to rectify the received AC power to DC power to power the base unit. The AC power transfer unit is at the expansion dock and coupled to the external power connector. The removable expansion unit includes a performance enhancing component and an expansion power supply to receive AC power from the AC power transfer unit and to rectify the received AC power to DC power to power the removable expansion unit.

In another example gaming console, the AC transfer unit is a AC power backbone.

In another example gaming console, the AC transfer unit is a first half of an AC inductive coupling and the removable expansion unit includes a second half of the AC inductive coupling.

What is claimed is:

1. A modular gaming console comprising:
   a base unit including:
      a base system board to provide computing functionality to the base unit;
      an external power connector to receive AC power into the base unit;
      a base power supply to rectify a first portion of the received AC power to DC power to power the base unit; and
      an expansion dock; and a gaming controller for the gaming console to removably receive an expansion unit; and
   an AC power transfer unit for transferring a second portion of the received AC power to the expansion unit at the expansion dock.

2. The modular gaming console of claim 1, wherein the AC transfer unit includes an AC power backbone at the base unit.

3. The modular gaming console of claim 1, wherein the AC transfer unit includes a first half of an AC wireless power coupling at the base unit.

4. The modular gaming console of claim 3, further comprising:
   a removable expansion unit including a second half of the AC wireless power coupling, the second half to form a wireless power transfer device in combination with the first half of the AC wireless power coupling at the base unit.

5. The modular gaming console of claim 1, further comprising:
   a removable expansion unit including:
      an expansion system board incorporating a performance enhancing component; and
      an expansion power supply to receive the second portion of the AC power from the AC power transfer unit and to rectify the received AC power to DC power to power the expansion unit.

6. The modular gaming console of claim 5, further comprising:
   a data connector between the base system board and the expansion system board.

7. The modular gaming console of claim 5, wherein the performance enhancing component includes one or more of a CPU, GPU, memory, data storage, and additional physical connectors.

8. The modular gaming console of claim 5, wherein the base power supply is sized to power solely the base unit, and wherein the expansion power supply is sized to power solely the removable expansion unit.

9. The modular gaming console of claim 5, wherein the base unit and the removable expansion unit share a common heat exchanger.

10. The modular gaming console of claim 5, wherein the base unit and the removable expansion unit share one or both of a common virtual addressing space and a programming model.

11. The modular gaming console of claim 5, wherein the expansion dock includes a switch to trigger connection of the AC power transfer unit between the base system board and the expansion system board responsive to proximity of the removable expansion unit to the expansion dock.

12. The modular gaming console of claim 6, wherein the expansion dock includes a switch to trigger connection of the data connector between the base system board and the expansion system board responsive to proximity of the removable expansion unit to the expansion dock.

13. The modular gaming console of claim 6, wherein the data connector to utilize a near-field, high-speed wireless connection.

14. A method of powering a modular gaming console, the method comprising:
   receiving AC power from an external power connector to a base unit of the modular gaming console;
   rectifying a first portion of received the AC power to DC power to power the base unit;
   docking a removable expansion unit within an expansion dock of the base unit;
   transferring a second portion of the received AC power from the base unit to the expansion unit via an AC power transfer unit at the expansion dock;
   rectifying the transferred AC power to DC power to power the expansion unit; and
   establishing a data connection between the base unit and the expansion unit and controlling the gaming console using a game controller.

15. The method of claim 14, wherein the docking operation includes:
   removing an initial expansion unit from the expansion dock;
   selecting the removable expansion unit from a selection of available expansion units; and
   installing the selected removable expansion unit within the expansion dock.

16. The method of claim 14, wherein prior to the transferring operation, the method further comprises:
   detecting that the removable expansion unit is successfully docked within the expansion dock; and
   powering the AC power transfer unit responsive to the detecting operation.

17. A gaming console comprising:
   a base unit including:
      a system board;
      a data connector to the system board at an expansion dock;

an external power connector to receive AC power into the base unit; and a base power supply to rectify a first portion of the received AC power to DC power to power the base unit;

an AC power transfer unit for transferring a second portion of the received AC power to the expansion dock; and a removable expansion unit including a performance enhancing component and an expansion power supply to receive AC power from the AC power transfer unit and to rectify the received AC power to DC power to power the removable expansion unit and a game controller for the gaming console.

18. The gaming console of claim 17, wherein the AC transfer unit is an AC power backbone.

19. The gaming console of claim 17, wherein the AC transfer unit is a first half of an AC wireless power coupling and the removable expansion unit includes a second half of the AC wireless power coupling.

* * * * *